July 8, 1958

C. A. HUNTING 2,842,001

VARIABLE SPEED TRANSMISSION DEVICE

Filed Oct. 26, 1954

Inventor
Colin A. Hunting
by George H. Baldwin
Attorney

United States Patent Office 2,842,001
Patented July 8, 1958

2,842,001

VARIABLE SPEED TRANSMISSION DEVICE

Colin Alfred Hunting, Sandringham, Victoria, Australia

Application October 26, 1954, Serial No. 464,733

6 Claims. (Cl. 74—191)

The invention relates to variable speed units of the type which include a pair of circular friction drive elements which are in constant engagement and one of which has a friction face of constant effective diameter and are adapted to be attached to machines requiring a wide range of variation in their operating speed.

Many industrial machines, whether or not adapted for operation at a series of predetermined speeds, frequently cannot be operated at optimum speed for a particular purpose for which they are suited when such speed lies between or beyond the set speeds for which the machine has been designed.

A particular example of machines requiring a wide variation of operational speed is found in food processing, where for example, the rate of passage of food containers through cooking and cooling apparatus must be adjusted to suit the cooking times of a wide variety of foodstuffs.

Other industrial applications of such variable speed units include printing machinery, machine tool manufacture, wood and metal-working machinery and various classes of conveyor systems.

The primary object of the present invention is to provide an improved variable speed transmission device of the kind indicated which is infinitely variable within its operative speed range and adapted for use with a wide variety of machines.

A further object of the invention is to provide a variable speed transmission device employing a minimum of working parts with consequent economy in production and ready maintenance and repair.

A variable speed transmission device according to the invention comprises a main supporting casing through which projects the driving shaft of an electric motor slidably secured externally of the casing and adapted to adjustably traverse said casing, a conical driving disc secured to the inwardly projecting extremity of the driving shaft, a driven assembly comprising a follower member supported at the inward extremity of a driven spindle extending outwardly of the casing and adapted to be operatively connected to a machine, said driven spindle being carried by a spring influenced thrust bearing assembly maintaining frictional engagement between the driving disc and the follower member.

A preferred and practical embodiment of the invention comprises a base element carrying a driving shaft and a driven shaft fitted at their adjacent inner ends with friction drive elements which are spring influenced to face and oppose each other with one of said elements having an annular face engaging a conical face on the other element, said shafts being located in substantially the same plane, but being relatively inclined in such a manner that the friction drive element on the driven shaft engages the friction drive element on the driving shaft between its axis and its periphery at one side only of the driving shaft and means for effecting relative transverse movement between said driving and driven shafts so as to increase or reduce the effective diameter of the circular path of engagement between said friction drive elements, the driving side of said conical face being disposed at an obtuse angle relatively to the axis of said driven shaft in order that as said transverse movement is effected between said friction drive elements, to increase or decrease the effective diameter of the said circular path of engagement, the effective strength of the spring influenced driving engagement therebetween will be reduced or increased as the case may be.

The invention will now be more fully described with reference to the embodiment of the invention illustrated in the accompanying drawings in which.

Figure 1:
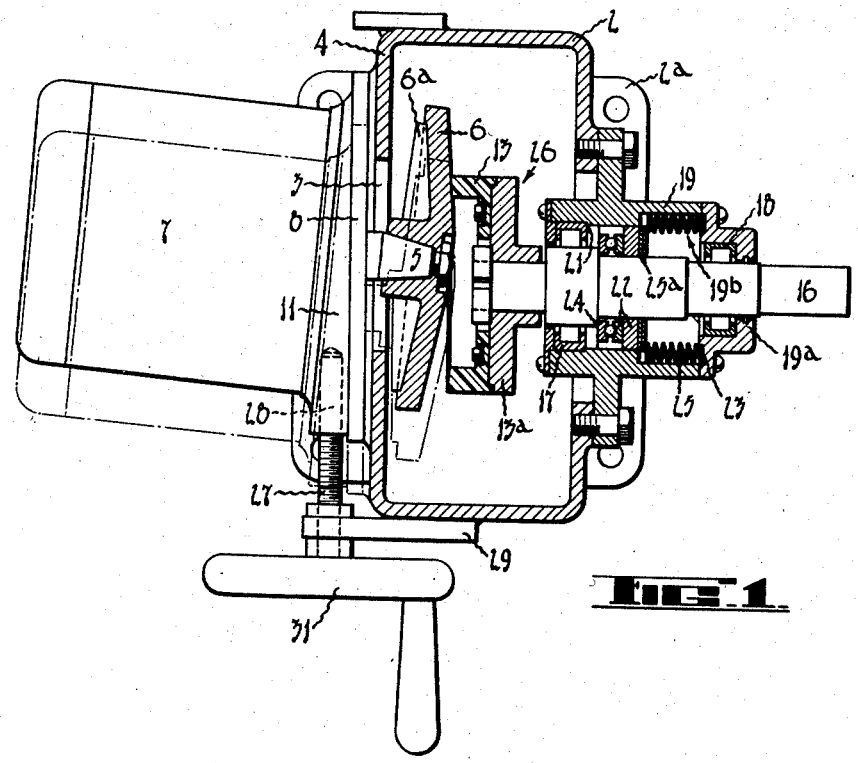
Figure 1 shows a part sectional plan of the apparatus.
Figure 2:
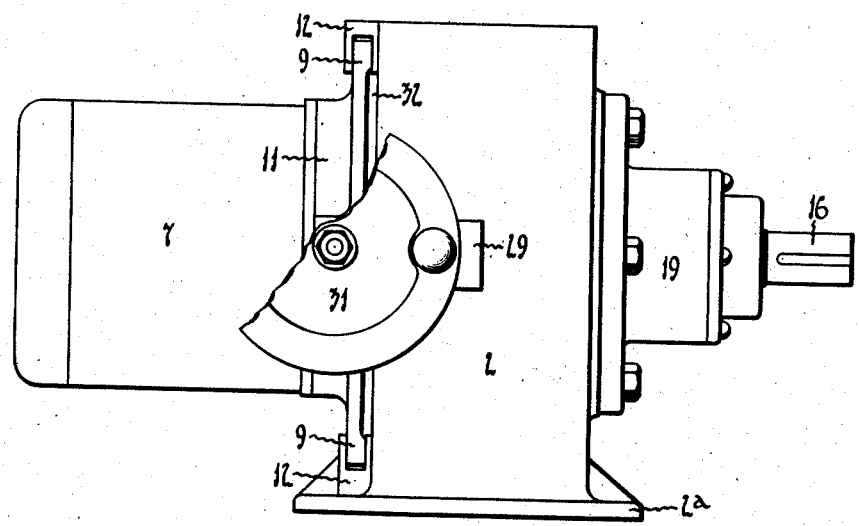
Figure 2 shows a side elevation of the appaartus shown in Figure 1.

The main supporting casing 2 is provided with supporting lugs 2a to hold it in any convenient attitude on a suitable support. The main supporting casing is provided with a transversely extending aperture 3 in the side-wall 4 (as indicated in Figure 1) through which projects the motor driving shaft 5, bearing at its projecting extremity, the conical driving disc 6.

The electric motor 7 is fixed to a rectangular based motor supporting plate 8 slidably engaged on opposite sides of the transversely extending aperture 3 in channelled parallel guides 12 which admit opposite marginal portions 9 of the motor supporting plate. The motor supporting plate 8, has a wedge shaped upraised thickened section 11 (indicated in Figure 1) which supports the electric motor 7 in an inclined attitude to the apertured main casing wall such that the conical driving disc 6 impinges on a portion of the upraised annular rim of a dished follower disc member 26 and makes flat contact with the rim of the follower disc which is mounted on the driven spindle 16.

The driven spindle 16 is supported by inner and outer bearings 17, 18 retained in the tubular housing 19 forming an extension of the main supporting casing and which may be detachably secured to the main supporting casing by retaining studs and nuts. The inner bearing 17 is supported by a projecting shoulder 21 in the tubular housing 19 and the outer bearing is accommodated in an oil sealing member 19a surrounding the driven spindle.

The driven spindle shaft is cut away intermediate the inner and outer bearings to accommodate the thrust race 22 held against the shoulder 24 of the driven spindle under the influence of compression springs 25, positioned in longitudinal slots 19b in the housing and extending between the thrust-race and a thrust retaining step or flange 23 inside the adjacent end of the housing, so that the driven spindle 16, which "floats" in its bearings, is thrust towards the motor driving spindle so as to maintain constant frictional engagement between the conical driving disc 6 and the rim of the dished follower disc member 26 and overcome the effect of wear upon the frictional element of the driving disc.

One or more spacing washers 25a may be interposed between the thrust race 22 and springs 25, and the number of such spacing washers may be varied to vary the effective strength of the springs to cater for different loadings of the apparatus in operation.

The outer end of the driven spindle may be splined so as to readily carry a pulley, gear or the like by means of which its rotational movement may be applied to driving a machine.

In this connection, the outer end of the driven spindle may be provided with a toothed pinion in constant mesh with a gear carried by a member which is mounted on the housing 19 and capable of pivoting about the axis of the driven spindle, the gear having an output shaft with a pulley or sprocket from which a drive to subsidiary apparatus may be taken. Such an arrangement will ensure that the tension of the belt or chain, between said pulley or sprocket and the subsidiary apparatus, may be readily adjusted by pivoting the member on the housing.

Infinite variation between motor speed and driving speed of the driven spindle is simply achieved by effecting transverse movement of the motor and hence the motor driving shaft and its attached driving disc so that the rim of the follower disc bears against the driving disc at any desired point between its centre and periphery.

The conical driving disc 6 may be driven a relatively constant speed by the motor 7, and for any given power output from the driven spindle there is a greater tendency for slip to occur between the conical driving disc and the driven follower member 26 when the latter is driven at a relatively slow speed, i. e. when it is in frictional engagement with the conical driving disc, towards the centre thereof. To overcome or minimize that tendency, means are proposed whereby the operative pressure-influence of the springs 25 will be increased as the effective diameter of the circular path of engagement between the friction drive elements is decreased, and vice versa.

Thus, the driving side of the conical driving disc 6 is preferably disposed at an obtuse angle (slightly greater than a right angle) relatively to the axis of the driven shaft 16, and as the effective diameter of the said circular path of engagement is reduced, so will the shaft 16 be moved slightly away from the disc 6 thus further compressing the springs 25 and increasing the strength of the influence thereof on the driving-engagement; vice versa, the influence of the spring will be reduced as the effective diameter of the circular path of engagement is increased.

The preferred method of securing adjustable movement of the driving motor is by means of rotatable screw 27 retained by the bracket 29 attached to the casing wall, which cooperatively engages the female threaded orifice 28 in the thickened wedge-shaped portion 11 of the slidable motor supporting plate, so that upon clockwise or anticlockwise rotation of the hand-wheel 31, fixed to the outer extremity of the screw 27, the driving motor may be advanced or retracted with reference to the sidewall of the main casing supporting the hand-wheel to give a corresponding high or low reduction in driving speed relative to the motor speed, as indicated by the firm and dotted outlines of the motor 7 in Figure 1 of the drawings.

In circumstances calling for rapid variation of driving speed, the necessary transverse movement of the driving motor assembly, may be achieved by means of a lever pivotally attached to the main casing at one extremity and connected intermediate its length with a linking rod connected to the motor frame, so that movement of the lever correspondingly shifts the motor driving assembly.

The follower disc member 26 attached to the driven spindle, is a composite disc having a metal supporting member 13a and a removable replaceable frictional element 13, composed of fibre, plastic or other suitable material, which is softer than the surface of the driving disc and avoids wear of this member.

The rearward side of the conical driving disc 6 is preferably provided with radial vanes or fins 6a adapted to agitate and circulate air within the casing and cool the operative parts. In this connection, the casing should be provided with ventilating apertures, and to this end clearance gaps 32 may be provided at opposite sides of the casing.

It will be appreciated that modifications and variations of the invention may be made within its scope as defined in the appended claims.

Having now described my invention, what I claim as new and desire to secure by Letters Patent is:

1. A variable speed transmission device of the kind indicated comprising a main supporting casing upon which is slidably secured by means of a slidable motor supporting plate an electric motor mounted at an inclination to the plane of the supporting casing wall and adapted to traverse the casing wall under the influence of a rotatable screw retained by a bracket secured to the casing and which cooperatively engages a female threaded orifice in a thickened portion of the motor supporting plate, a conical driving disc mounted at the extremity of a motor driving shaft projecting within the casing maintained in frictional engagement with the upraised annular rim of a replaceable frictional element secured to a metal supporting member attached to the inner extremity of a driven shaft itself supported by a thrust bearing assembly retained in a tubular housing formed by an extension of the main supporting casing, said plane of said casing wall being perpendicular to the axis of said driven shaft.

2. An improved variable speed transmission device of the kind indicated comprising a base element carrying a driving shaft and a driven shaft fitted at their adjacent inner ends with friction drive elements which are spring-influenced to face and oppose each other with one of said elements having an annular face engaging a conical face on the other element, said shafts being located in substantially the same plane, but being relatively inclined in such a manner that the rim of the annular friction drive element engages the conical face of the other friction drive element between its apex and its periphery at one side only of the conical face and means for effecting relative transverse movement between said driving and driven shafts in a direction perpendicular to the rotational axis of said annular friction drive element so as to increase or reduce the effective diameter of the circular path of engagement between said friction drive elements, the rim-engaged side of said conical face being disposed at an obtuse angle relatively to the axis of rotation of said annular friction drive element in order that as said transverse movement is effected between said friction drive elements, to increase or decrease the effective diameter of the said circular path of engagement, the effective strength of the spring-influenced driving engagement therebetween will be respectively reduced or increased as the case may be.

3. In a variable speed transmission device comprising a driving motor having a frame and a rotatable shaft; a casing having an elongated aperture at one end through which said shaft extends, a driven shaft extending through the other end of said casing, a pair of rectilinear parallel guides on said casing adjacent said aperture and generally parallel thereto and in a plane perpendicular to the axis of said driven shaft, a motor mounting member carried by said guides for sliding therealong, said motor frame being supportedly affixed to said mounting member in a position to dispose the motor shaft axis at an obtuse angle to the axis of said driven shaft and in a plane which is parallel to said guides and which includes the driven shaft axis, a driving disc on said motor shaft within said casing having a conical driving face with its apex toward said driven shaft, a dished follower on said driven shaft having an annular rim engaging one side of said face, said one side of said face extending outwardly from said apex at an angle of more than ninety degrees to said driven shaft axis, and a spring biasing said follower in a direction axially of said driven shaft and toward said driving face.

4. A variable speed transmission device comprising an electric motor having a frame, a main supporting casing having a transversely extending aperture through which the driving shaft of said motor projects into said casing, a motor-supporting plate fixed to said motor, a pair of elongated parallel guides fixed externally to said casing adjacent said aperture and supportingly engaging opposite margins of said plate, adjustable means for traversing said plate and motor along said guides, a single driving disc having a conical driving face secured to the inwardly projecting extremity of said driving shaft, a driven assembly comprising a single follower member supportedly attached at the inward extremity of a driven spindle which extends outwardly of the casing, said driven spindle being carried by a spring influenced thrust bearing assembly maintaining frictional engagement between said driving face and said follower member, said guides being disposed in a plane perpendicular to the axis of said spindle, said plate having a wedge-shaped thickened section to which said motor frame is attached, said thickened section being oriented and proportioned to incline said motor in the direction of said guides and thereby to dispose the axis of said driving shaft at an obtuse angle with respect to the spindle axis, said follower member having an upraised annular frictional rim engaging a small area of a predetermined side of said conical driving face, the angle between said engaged side of said face and said spindle axis being greater than a right angle, whereby adjustment of said plate, motor and disc along said guides in a direction to engage said rim closer to the apex of said cone moves said driven spindle axially against said spring influence thereby to increase the force of said rim against said driving face.

5. A variable speed transmission device according to claim 4 in which the follower member comprises a metal supporting member having a flat forward face and a replaceable, cup-shaped member formed of frictional material and having within its annular rim a flat bottom portion, said cup-shaped member being bolted through its bottom portion to the forward face of said metal supporting member.

6. A variable speed transmission device according to claim 4 in which a thrust bearing assembly comprising a thrust bearing and an inner and an outer bearing supports the driven spindle, a tubular housing is formed by an extension of the main supporting casing and houses said bearing assembly, said tubular housing has a projecting shoulder supporting said inner bearing, an oil sealing member surrounds the driven spindle and accommodates said outer bearing, said sealing member having a thrust retaining step surrounding said outer bearing, said spindle being reduced adjacent said inner bearing to form a thrust shoulder abutted by said thrust bearing, and a plurality of compressional springs are disposed in said housing spacedly about said spindle and compressed between said thrust retaining step and said thrust bearing.

References Cited in the file of this patent

UNITED STATES PATENTS

| | | |
|---|---|---|
| 2,297,078 | Schlichter | Sept. 29, 1942 |
| 2,570,493 | Schmidt | Oct. 9, 1951 |

FOREIGN PATENTS

| | | |
|---|---|---|
| 422,414 | Italy | June 17, 1947 |
| 113,654 | Sweden | Mar. 27, 1945 |
| 127,084 | Sweden | Jan. 3, 1950 |